United States Patent [19]
McCulloch

[11] Patent Number: 5,930,606
[45] Date of Patent: Jul. 27, 1999

[54] ELECTRONIC DEVICE MANUFACTURE WITH A LASER BEAM

[75] Inventor: David J. McCulloch, Redhill, United Kingdom

[73] Assignee: U.S. Philips Corporation, New York, N.Y.

[21] Appl. No.: 08/772,077

[22] Filed: Dec. 20, 1996

[30] Foreign Application Priority Data

Jan. 4, 1996 [GB] United Kingdom .................. 9600091
Mar. 21, 1996 [GB] United Kingdom .................. 9605975

[51] Int. Cl.$^6$ .............................. H01L 21/00; H01L 21/84
[52] U.S. Cl. ........................... 438/157; 438/166; 438/489
[58] Field of Search ................................... 438/157, 166, 438/489; 219/121.8, 121.82

[56] References Cited

U.S. PATENT DOCUMENTS

| 4,059,461 | 11/1977 | Fan et al. ................................. | 148/1.5 |
| 4,309,225 | 1/1982 | Fan et al. ................................. | 148/1.5 |
| 5,130,829 | 7/1992 | Shannon .................................. | 359/59 |
| 5,453,122 | 9/1995 | Chae ....................................... | 437/101 |
| 5,696,003 | 12/1997 | Makita et al. ............................ | 437/21 |
| 5,712,191 | 1/1998 | Nakajima et al. ....................... | 437/174 |
| 5,756,634 | 5/1998 | Tanaka et al. ........................... | 437/21 |

FOREIGN PATENT DOCUMENTS

3-62924  3/1991  Japan .

OTHER PUBLICATIONS

Excimer–Laser–Annealed Poly–Si Thin–Film Transistors, by S.D. Brotherton et al, IEEE Transaction on Electron Devices, vol. 40, No. 2, Feb. 1993.

Beam Shape Effects With Excimer Laser Crystallisation of Plasma Enhanced and Low Pressure Chemical Vapor Deposited Amorphous Silicon, S.D. Brotherton et al, Solid State Phenomena vols. 37–38 (1994) pp. 299–304, Month Unknown.

*Primary Examiner*—John F. Niebling
*Assistant Examiner*—Michael S. Lebentritt
*Attorney, Agent, or Firm*—John C. Fox

[57] ABSTRACT

In the manufacture of an electronic device comprising thin-film circuitry, a semiconductor film (1) on a polymer substrate (2) is subjected to a laser treatment, for example laser crystallisation, with a laser beam (10). The beam is reflected by the film (1). Significant non-uniformities in the laser treatment are found to occur due to a local overheating effect if the reflected laser beam 10b impinges again on the heated area of the film (1). Thus, the invention identifies a particularly acute problem which arises when the device substrate (2) is of a heat-distortable polymer material in that the substrate (2) may experience temporarily a concave distortion at an area where the semiconductor film (1) on the substrate (2) is heated by the incident laser beam (10). The beam is focused as well as reflected by the concave distortion in the substrate (2). Although the film (1) is under a window (22) of the treatment cell (20), this focused and reflected laser beam (10a) is prevented from being reflected again onto the same area of the film (1), by tilting the window (22) and/or the film/substrate (1,2) at the area of the concave distortion at an angle θ so as to be inclined with respect to one another along the path of the beam (10).

10 Claims, 4 Drawing Sheets

ELECTRONIC DEVICE MANUFACTURE WITH A LASER BEAM

BACKGROUND OF THE INVENTION

This invention relates to methods of manufacturing electronic devices comprising thin-film circuitry, in which a semiconductor film on a polymer substrate is subjected to a laser treatment (for example for crystal growth in the film). The device may be a large area image sensor, or a flat panel display (for example a liquid crystal display), or several other types of large-area electronic device (for example a thin-film data store or memory device, or a thermal imaging device). The invention also relates to laser apparatus suitable for use in such methods.

There is currently much interest in developing thin-film circuits with thin-film transistors (hereinafter termed "TFT"s) and/or other semiconductor circuit elements on inexpensive insulating substrates for large area electronics applications. These circuit elements fabricated with separate semiconductor islands of an amorphous or polycrystalline semiconductor film may form the switching elements in a cell matrix, for example in a flat panel display as described in U.S. Pat. No. 5,130,829 (our reference PHB 33646), the whole contents of which are hereby incorporated herein as reference material.

Recent developments involve the fabrication and integration of thin-film circuits (often using polycrystalline silicon) as, for example, integrated drive circuits for such a cell matrix. In order to increase the circuit speed, it is advantageous to use semiconductor material of good crystal quality and high mobility for thin-film islands of the TFTs of these circuits. From, for example U.S. Pat. Nos. 4,059,461 and 4,309,225 and the journal articles of S. D. Brotherton, D. J. McCulloch et al in IEEE Transactions on Electron Devices, Vol. 40 No. 2, February 1993, pages 407 to 413 and in Solid State Phenomena vols. 37–38 (1994) pages 299 to 304 (Scitec Publications, Switzerland), it is known to deposit a semiconductor film of amorphous material or low crystallinity material and to form the material of higher crystallinity by exposing, at least an area of this film to an energy beam from a laser. The whole contents of said United States patents and said journal articles are hereby incorporated herein as reference material. It is also known to use laser beam treatments for annealing implanted dopant and/or diffusing dopant in a semiconductor film in thin-film circuit manufacture.

As shown in said United States patents and said journal articles, the substrate with the deposited film is mounted within a sample chamber (also termed "cell") having a transparent window through which the laser beam enters. The cell provides a controlled atmospheric ambient (for example an inert gas ambient or vacuum) around the substrate/film sample. Generally the substrate/film sample is scanned below the laser beam, and this scanning may be achieved by mechanically moving the sample cell in the laser apparatus.

For many of the large-area electronic devices it is becoming desirable to use polymer material as the substrate for reasons of low cost, low weight and/or physical flexibility. The deposition of amorphous silicon material can be carried out at lower temperatures than the deposition of crystalline material and so is advantageous having regard to the maximum permissible temperatures for use with polymer substrates. These temperatures for polymers are generally lower than the maximum usable temperatures for glass substrates. Polyimide is one popular polymer material for the substrate of a large-area electronic device. The maximum usable temperature for polyimide is generally about 280° C. The maximum usable temperature for a polymer material refers to the maximum sustained temperature at which the polymer material can be held for a prolonged period and retain its polymer characteristics, for example its flexibility and electrically insulating properties. Examples of other suitable polymer materials which may be used for the device substrate, together with their maximum usable temperatures are:

| Polyethersulphone | (PES) | 200° C. |
| Polyacrylate | (PAR) | 180° C. |
| Poyetherimide | (PEI) | 170° C. |
| Polyethyelenenapthalate | (PEN) | 150° C. |
| Polyethyeleneterepthalate | (PET) | 130° C. |

As the semiconductor film can reach very high temperatures (for example, in excess of 1200° C.) in the laser treatments, the film is generally deposited on one or more interface layers on the polymer substrate. These interface layers may be of (thermally and electrically) insulating material and/or material absorbing any laser light which penetrates through the thickness of the semiconductor film and/or can improve the adhesion of semiconductor film to polymer substrate. In spite of such measures, the present applicant finds that the laser treatment of semiconductor films on polymer substrates (as compared with glass substrates) tends to result in less uniform semiconductor material which is less satisfactory for device manufacture. For example, when the laser treatment serves for crystal growth, the present applicant finds that significant non-uniformities in the crystallised material may be produced along the scanned direction(s) of the film, in spite of consistent uniformity in the laser beam during scanning. These non-uniformities include differences in grain size and quality and a roughening of surface areas of the semiconductor film, the extent of the non-uniformities being sufficient to result in different device characteristics in the thin-film devices formed with different film areas. Furthermore, areas of the semiconductor film may become detached from the substrate and/or ablated, and areas of the polymer substrate may even exhibit heat damage, in spite of the inclusion of interface layers which should prevent such happenings.

It is an aim of the present invention to avoid or at least to reduce such non-uniformities and damage.

The present invention is based on a recognition by the present inventor that local distortion of the scanned polymer substrate at the area of the laser beam may occur (at least temporarily) due to substrate heating and can be a contributory factor in causing the damage and the poor uniformity in the semiconductor film laser-treated on polymer substrates. The present inventor has discovered that this local distortion may even focus the laser light reflected from the substrate/film sample which, if then reflected back again to the same local area of the film, can produce overheated spots. The present invention avoids this cause of poor uniformities by directing away the reflected laser light so that it is not reflected back again on to the film, or at least not reflected back again onto the same local area of the film.

Thus, according to one aspect of the present invention, in a method of manufacturing an electronic device a semiconductor film on a polymer substrate is subjected to a laser treatment from a laser beam, the beam being transmitted through a window over the film, the beam being reflected by the film, and the window and the substrate being inclined with respect to one another in the path of the beam to prevent the reflected beam from impinging again on the film.

According to another aspect of the present invention, there is provided laser apparatus suitable for use in such a method and comprising a cell for accommodating a polymer substrate with a semiconductor film for a laser treatment, and mounting means in the cell for mounting the substrate for exposing the film to a laser beam through a window of the cell, wherein the window of the cell and the mounting means for the substrate are inclined with respect to one another in the path of the beam from the window to prevent the reflected beam from impinging again on the film.

This prevention of back reflection onto the film from the window of a cell may be achieved by tilting the window and/or by tilting the substrate itself at least in that area. The perpendicular to the window and/or the substrate in the area of the beam path may be inclined at an angle in the range of 20° to 60°, and preferably in the range of about 35° to about 45°. The maximum usable angle depends on the height available in the laser apparatus to accommodate the increased height of the cell and also depends on reducing reflection of the laser beam at the front face of an inclined window and/or on the depth of the focus of the laser beam at an inclined substrate. The minimum usable angle depends on whether one or both of the windows and substrate are inclined and depends on obtaining adequate deflection of the reflected beam away from the area of the film/substrate exposed to the laser beam. What constitutes adequate deflection can depend on the internal shape of the cell and the particular area(s) on which the reflected beam impinges. Small angles (for example in the range of 20° to 30°) can be used when both the window and the substrate are inclined in opposite directions to the path of the beam.

It may be noted that it is known from the JP-A 03-62924 English-language abstract in the Patent Abstracts of Japan Vol.15 No.219 (E-1074) (4747) to prevent the effect of returning light on laser output by passing the beam through one or more inclined glass plates (termed "substrates"). These plates are arranged between the laser light source and a total reflection mirror which directs the laser beam onto the sample undergoing the laser treatment. The plates have an anti-reflection coating on the side facing the laser light source being protected, so that the laser light is not reflected on that side. The opposite side (i.e. facing the total reflection mirror) has no anti-reflection coating, and the angle of inclination of the plate to the beam is such that the beam reflected at this opposite side is directed away from the path of the incident beam. Such an arrangement is quite unlike that adopted in accordance with the present invention in which measures are taken to prevent a local overheating effect of the laser light on the sample.

The present invention avoids such overheating while permitting laser treatments to be carried out on a sample which comprises a device substrate of heat-distortable polymer material, even in a particularly acute case in which the polymer material experiences (at least temporarily) a concave distortion in the substrate at an area where a semiconductor film on the substrate is heated by the incident laser beam. The beam is incident through a window over the sample, and the laser beam is focused as well as reflected by the concave distortion in the substrate. However, this focused and reflected laser beam is prevented from being reflected again onto the area of the film heated by the laser beam, because the facing window and/or the sample at the area of the concave distortion are tilted so as to be inclined with respect to one another.

Such an arrangement in accordance with the present invention does not require an anti-reflection coating to be provided on the obliquely facing surfaces of the window and the substrate/film, and so the problems of providing and maintaining anti-reflection coatings on these surfaces can be avoided. Thus, for example, an anti-reflection coating on the inner surface of a cell window can become contaminated and damaged by reactants and residues of a laser treatment carried out in the cell, and frequent cleaning and/or replacement of this coating can be both inconvenient and expensive. The provision of an anti-reflection coating on the sample may interfere with the desired treatment and/or characteristics of the film structure on the substrate. Thus, for example, the surface of a semiconductor film which is laser-crystallised with an anti-reflection coating thereon may exhibit severe roughening because of the presence of this coating.

BRIEF DESCRIPTION OF THE DRAWINGS

These and other features in accordance with the present invention, and their advantages, are illustrated specifically in embodiments of the invention now to be described, by way of example, with reference to the accompanying diagrammatic drawings, in which.

It should be noted that all the FIGS. 1 to 6 are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in different embodiments.

DESCRIPTION OF THE PREFERRED EMBODIMENTS

Figure 1:
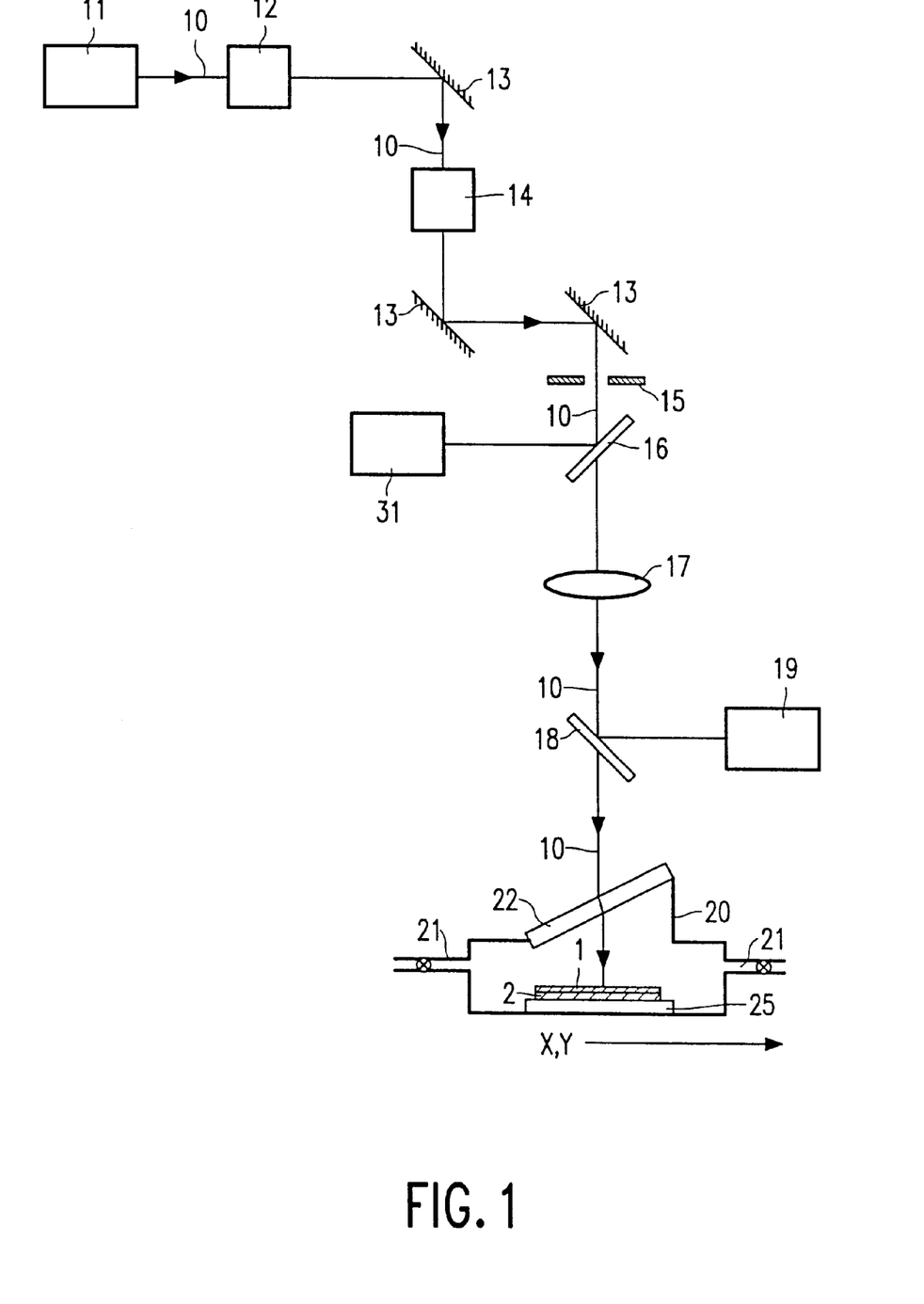
FIG. 1 is a schematic of laser apparatus in accordance with the present invention and suitable for use in a manufacturing method in accordance with the present invention.

FIG. 1 illustrates a laser apparatus in accordance with the present invention which may be used in a method in accordance with the present invention in order to crystallise a semiconductor film 1 on a polymer substrate 2 in the manufacture of a large-area electronic device. The film 1 may be deposited in known manner by, for example, a plasma-enhanced chemical vapour deposition (PECVD) process at a low temperature, for example between 100° C. and 250° C. Typically, the film 1 may be of amorphous silicon material having a hydrogen content, for example, and often designated as α-Si:H material. The thickness of the silicon film 1 may be typically less than 0.1 $\mu$m, for example about 0.05 $\mu$m or less. The polymer substrate 2 may be of known materials, for example polyimide or the other polymer materials previously listed as suitable for use with large-area electronic devices. Typically the polymer substrate 2 may be a self-supporting film having a thickness of less than 200 μm. Typically interface layers as previously described are provided on the polymer substrate 2 before depositing the silicon film 1. These interface layers are not illustrated in the Figure for simplicity of the drawings.

FIGS. 1 to 5 illustrate the laser crystallisation of the film 1 on the thin polymer substrate 2 by a method and apparatus in accordance with the present invention. The laser crystallisation system may be similar to those described in the said U.S. patents and the said journal articles, except for a special optical arrangement of the sample cell 20 in accordance with the present invention. Preferably a pulsed laser beam 10 of an ultra-violet wavelength is used, generated by an excimer laser 11. A laser beam 10 of ultra-violet wavelength has the known advantage of permitting control of its absorption depth in the semiconductor material of the film 1. As a specific example, FIG. 1 illustrates a laser crystallisation system similar to that in FIG. 1 of the journal article "Beam shape effects with excimer laser crystallisation of plasma enhanced and low pressure chemical vapour deposited amorphous silicon" by S. D. Brotherton, D. J. McCulloch et. al. in Solid State Phenomena volumes 37–38 (1984) pages 299 to 304.

Thus the laser equipment of FIG. 1 may comprise in the main path of the beam 10: an aftenuator 12; total reflection mirrors 13 for deflecting the whole beam 10; an optional homogeniser 14 to provide an option for changing the beam shape; at least one aperture 15; an optional partially-reflective glass plate 16 to permit viewing of the beam shape by an optional CCD camera 31; a condensing lens 17; a partially-reflective glass plate 18 to permit measurement/monitoring of the beam energy by a pulse energy meter 19; another optional CCD camera (not shown in FIG. 1 or in the Solid State Phenomena article) possibly with a partially-reflective glass plate for optional viewing of the exposed area of the film 1, using visible light for the viewing; and the cell 20 in which the film/substrate sample 1, 2 is mounted.

The cell 20 provides a controlled atmospheric ambient around the film/substrate sample 1, 2 and so has at least one gas inlet/outlet port 21. Thus, in known manner, a gas ambient may be provided or extracted through the port(s) 21. In some laser treatments (for example, where the laser beam 10 initiates or aids chemical etching, chemical deposition or some other chemical process with the film 1) this ambient may comprise one or more chemically active elements. However, in most laser treatments (for example, film crystallisation or dopant implant anneal), a chemically inactive ambient is desirable, for example a vacuum or a flow of an inert or inactive gas such as, for example, nitrogen.

The cell 20 also comprises mounting means 25 for mounting the film/substrate sample 1, 2 in the path of the laser beam 10. In the case of glass substrates as described in the said United States patents and journal articles the substrate mounting means (for example in U.S. Pat. No. 4,309, 225) may be used to heat the substrate. A degree of low-temperature heating may be desirable in the cell 20 of the present apparatus for maintaining a low moisture content in the polymer substrates 2. Alternatively the inclusion of temperature control means 29 in the mounting means 25 may be used to keep the polymer substrate 2 cool when the film 1 is heated by the laser beam 10. Temperature control means 29 are illustrated schematically in the mounts of FIGS. 3 and 4, by way of example.

The cell 20 also provides for scanning the film 1 below the laser beam 10. The scanning may be achieved by moving the cell 20 relative to the beam 10 (for example in both X and Y directions) and/or by moving the substrate mounting means 25 within the cell 20.

Figure 2A:
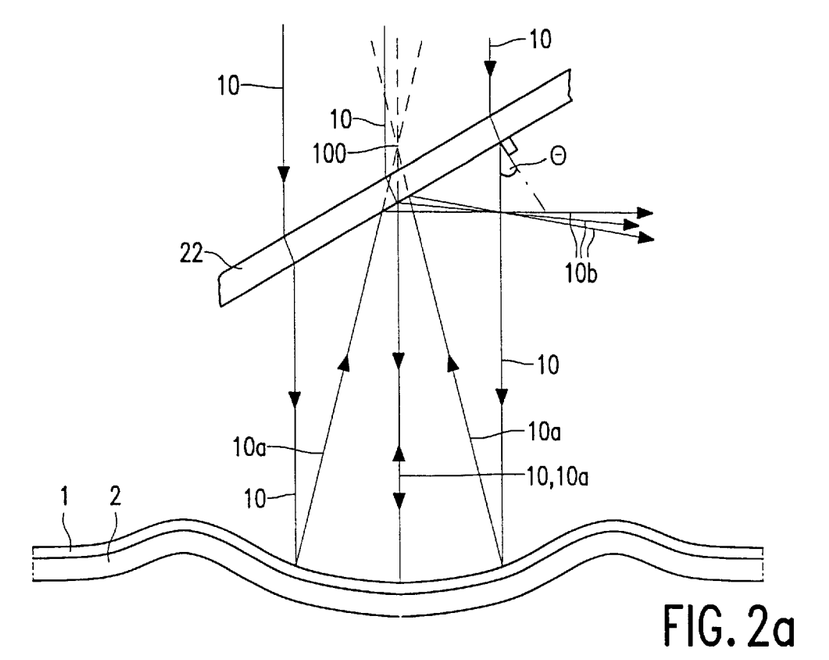
FIGS. 2a and 2b are cross sectional schematics of a semiconductor film on a polymer substrate, illustrating the local distortion which can occur at the area of the laser beam and illustrating its effect in an arrangement in accordance with the present invention.
Figure 2B:
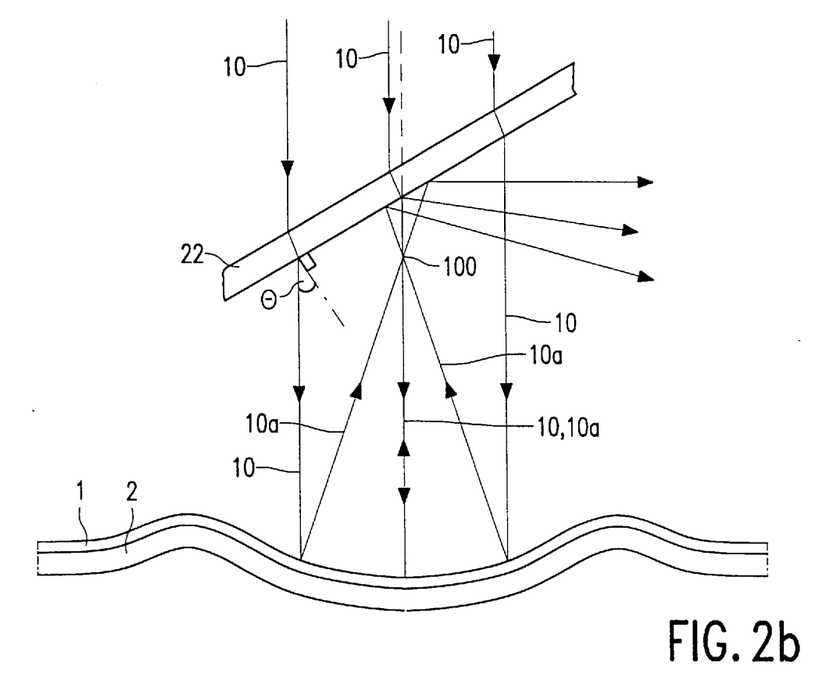
Figure 6A:
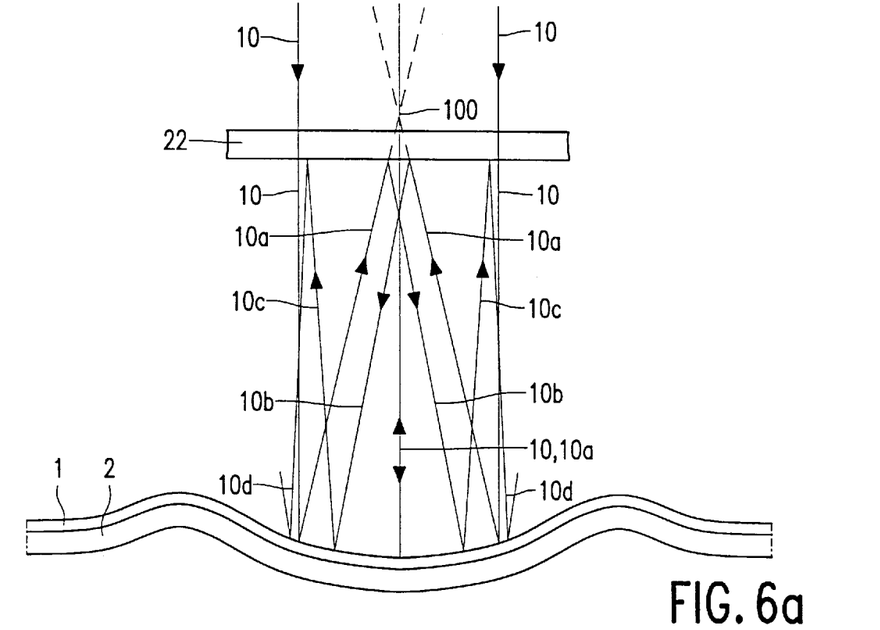
FIGS. 6a and 6b are cross sectional schematics of a semiconductor film on a polymer substrate, illustrating the local distortion which can occur at the area of the laser beam and illustrating its effects in a prior art arrangement.
Figure 6B:
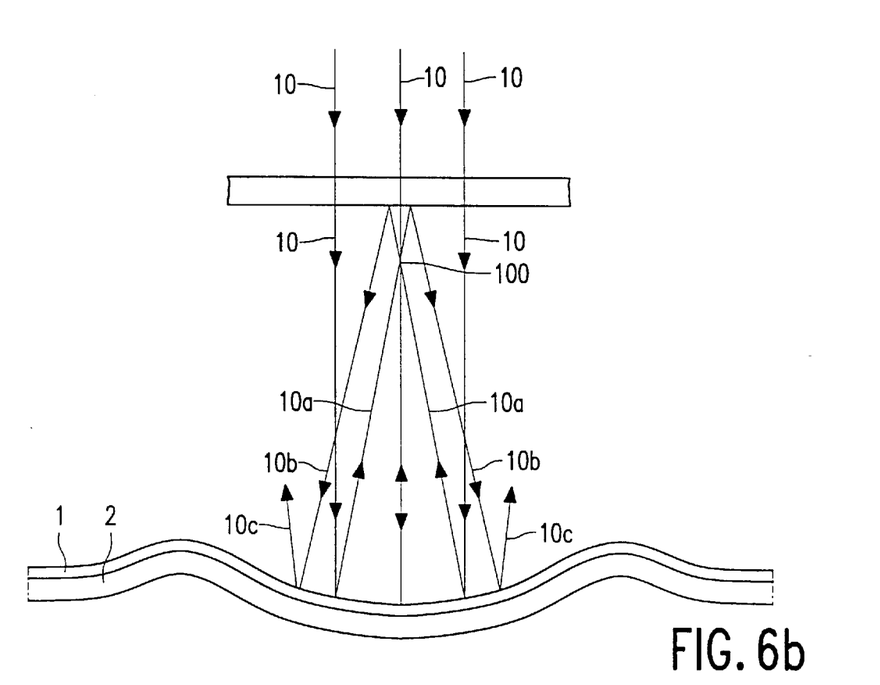

The laser beam 10 is incident on the semiconductor film 1 through a facing window 22 of the cell 20. In the prior-art laser apparatus of the said U.S. patents and journal articles, the window 22 is parallel to the thin film 1 and is perpendicular to the laser beam 10. FIGS. 2 and 6 illustrate a distortion problem which the present inventor has seen occurring with a semiconductor film 1 on a thin polymer substrate 2 and which produces a non-uniformity problem by multiple reflection (see FIG. 6) when such a prior-art arrangement is used. Where the semiconductor film 1 absorbs the incident energy beam 10 it is heated to a very high temperature (for example, in excess of 1200° C.) and typically melts in this area. The inventor believes that this localised heating of the film 1 tends to distort temporarily the thin polymer material 2 under the beam in such a way that the film 1 may act as a focusing mirror for the duration of the laser pulse. The inventor finds that this local distortion of the polymer substrate 2 is not usually permanent but disappears when the local heating dissipates. The duration of the heat pulse produced in a silicon film 1 by a laser pulse of 10 ns (nanoseconds) or less is of the order of 100 ns. The relaxation time of the polymer material is generally longer. Some of the laser light 10 is reflected back from the film 1, as illustrated by lines 10a in FIGS. 2 and 6. This reflected beam 10a is concentrated by the focusing effect of the concave distortion in the substrate 2 and film 1. FIGS. 2 and 6 show only three light rays being reflected by the distorted film area and show the reflected rays 10a coming to a focal point 100. In practice, because the distorted reflective surface of the film 1 is not part of a truly spherical surface, all the reflected rays 10a of the beam 10 from the distorted film area will not come together at the same focal point. Nonetheless the reflected beam 10a is concentrated at a soft focus.

The inventor finds that the focus 100 is at a distance from the reflective distorted film area which is comparable to the distance between the cell window 22 and the film/substrate 1,2. Typically this distance of the cell window 22 to the film/substrate 1,2 is about 1 cm (centimetre) or more. The distortion in the polymer substrate 2 is somewhat wider than the area of the laser beam 10 (for example about 1 cm with a beam width of 0.7 cm). The distortion in the substrate 2 having a thickness of about 200 μm or less seems to have a depth of about 0.05 cm (500 μm) in the central area. The inventor has not been able to measure this depth. However, the focal length resulting from this reflective distortion brings the reflected rays 10a to a focus near the window 22.

FIGS. 6a and 6b illustrate the prior art situation in which the facing window 22 and film/substrate 1,2 are parallel. In this case, the focused reflected light 10a is re-reflected back on to the sample surface (lines 10b in FIGS. 6a and 6b) by the cell window 22. FIG. 6a illustrates the worst situation in which the focus 100 is beyond the front face of the window 22. In this case the reflected rays 10b from the window 22 are concentrated on an area of the film 1 smaller than (and contained within) the area exposed to the original incident beam 10. When the distortion is such that the focus 100 is between the film 1 and window 22, the reflected rays 10b from the window 22 are incident on a larger area of the film 1. However, in both cases there is an overlap (and hence an enhanced heating effect) on the film 1 of the original incident beam 10 and the reflected beam 10b. Furthermore, even within the overlapped area there can be local further concentrations of the reflected light 10b due to the reflective distorted surface of the film 1 not being truly spherical. Furthermore, the rays 10b reflected by the window 22 are further reflected by the distorted film 1 as rays 10*c*, and these rays 10*c* may be reflected back again to the film 1 (as rays 10*d*) by the facing window 22 in the prior art arrangements of FIGS. 6*a* and 6*b*. Thus, by multiple reflections by the distorted film 1 and the facing window 22, the laser light may be concentrated into small and intense spots at the surface of the film 1. It seems that such small and intense spots caused by the inhomogeneous re-reflected light 10*b*, 10*d* are the cause of non uniformity in the crystallised semiconductor film 1 and may even locally damage the polymer substrate 2.

The focused laser light 10*a*,10*c* is re-reflected back onto the sample surface (as lines 10*b*) by the parallel cell window 22 directly facing the film/substrate sample 1,2 in the prior-art laser apparatus of the said U.S. patents and journal articles. This problem is avoided in accordance with the present invention by tilting the cell window 22 and/or the film/substrate sample 1, 2 at an angle sufficient to prevent the reflected beam 10*a* from impinging again on the film 1. This arrangement suppresses, as illustrated in FIGS. 1, 2*a*, 2*b*, 3, 4 and 5, the multiple reflections which would otherwise lead to multiple-exposure hot-spots in the film 1.

Thus, FIGS. 2*a* and 2*b* illustrate the simple expedient of inclining the cell window 22 at an angle θ in the range of 35° to 45° with respect to the laser beam 10, while keeping the mounting of the film/substrate 1,2 perpendicular to the beam 10. The angle θ is the angle between the perpendicular to the reflective surface of the window 22 and the path of the beam before reflection. FIG. 2*a* illustrates the situation with the focus 100 behind the window 22 when viewed from the film/substrate 1,2 and may be compared with the prior art FIG. 6*a*. FIG. 2*b* illustrates the situation with the focus 100 between the window 22 and the film/substrate 1,2 and may be compared with the prior art FIG. 6*b*. In both FIGS. 2*a* and 2*b* the focus 100 is in the vicinity of the window 22. It is advantageous to maintain the film/substrate 1,2 generally perpendicular to the beam 10 so as to facilitate the focusing of the beam 10 as a well-defined shape over the whole exposed area of the film 1 and to maximise the pulse energy within the well-defined beam 10 at the incident area of the film 1.

By choosing an angle θ around 45° for the inclination of the window 22 a maximum deflection of the reflected beam 10*b* at the window 22 is obtained away from the film 1. Thus, the beam 10*b* reflected by the obliquely facing surface of the window 22 may be deflected away to an inner surface of the cell 20 where it is generally absorbed and/or dispersed. Rather than absorb the reflected light 10*b* in such a way as to heat the wall of the cell 20, it is preferable to have a surface 30 at which the reflected light 10*b* is scattered in a non-specular manner. However, whether using absorption or scattering, the reflected light 10*b* is not reflected again in a specular manner. Thus, except at the window 22, the inner surfaces 30 of the cell 20 may be for example, of non-polished, machined stainless steel which is satisfactory to scatter the laser light. The window 22 itself may be of, for example, high grade silica material which is transparent to the laser light.

It should be noted that by inclining the window 22 and/or the film/substrate 1,2 in this manner, it is generally not necessary to provide an anti-reflection coating on the facing surfaces of the window 22 and film 1. The inventor notes that the provision of an anti-reflection coating of, for example, silicon dioxide, on the silicon film 1 can roughen the surface of the film 1 during laser crystallisation. Furthermore, the provision of such a coating on the film 1 does not avoid the local distortion/focusing problem arising from the heat-distortable nature of the polymer substrate 1. Thus, such an anti-reflection coating is better avoided. Furthermore, an anti-reflection coating on the inside face of the cell window 22 can become contaminated by materials from the processing within the cell 20 and damaged during the laser treatment in the cell 20. Such a coating on the inside of the cell window may therefore need to be regularly replaced, which can prove expensive, and so is also better avoided. Normally, an anti-reflection coating may be provided on the outside face of the cell window 22. Furthermore, it should be understood that the provision of coatings for any purpose on the facing surfaces of the window 22 and film 1 is not excluded from the scope of the present invention. Thus, for example, in the fabrication of a particular device structure (for example with a top insulated gate) it may be desirable for an insulating film to be present on the silicon film 1 during the laser treatment (for example when annealing a dopant implant for doped source and drain aligned with the gate), and this insulating film may also have anti-reflection properties with respect to the laser beam.

Thus, a variety of different embodiments are possible for manufacturing methods and laser apparatus in accordance with the present invention.

Figure 3:
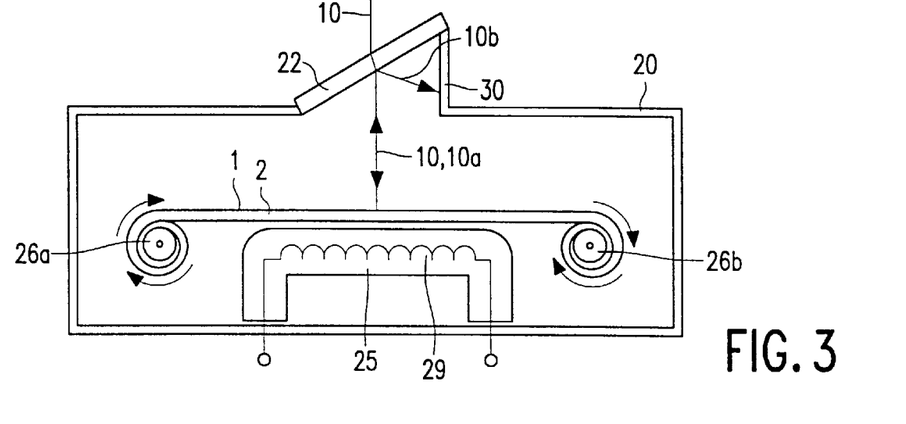
FIGS. 3 to 5 are cross sectional views of different cell arrangements for laser apparatus in accordance with the present invention.

FIG. 3 illustrates an embodiment in which the cell 20 has a single tilted window 22, with an inclination angle θ of FIGS. 2*a* and 2*b*. The focused laser light 10*a* which is reflected back from the film 1 is reflected by the tilted window 22 as beam 10*b* away from the film 1 so that it does not impinge again on the film 1. Thus, the laser light 10*b* reflected within the cell 20 by the tilted window 22 may be reflected to a wall 30 of the cell 20 where it is scattered and/or absorbed. In the embodiment shown in FIG. 3, the length of the window 22 in the scanning direction of the sample 1, 2 is smaller than the length of the sample 1, 2. In this situation, the sample 1, 2 is moved along within the cell 20 to scan the laser beam 10 along the thin film 1. This movement may be achieved by rotation of rollers 26*a* and 26*b* on which the sample 1,2 is mounted. The length of the sample 1,2 between these rollers 26*a* and 26*b* is mounted over a backing plate 25 of, for example, stainless steel. After it has been scanned below the laser beam 10, the laser-treated portion of the sample 1,2 can wind onto the rotating roller 26*b* while the next portion to be treated is unwound from the rotating roller 26*a*.

Figure 4:
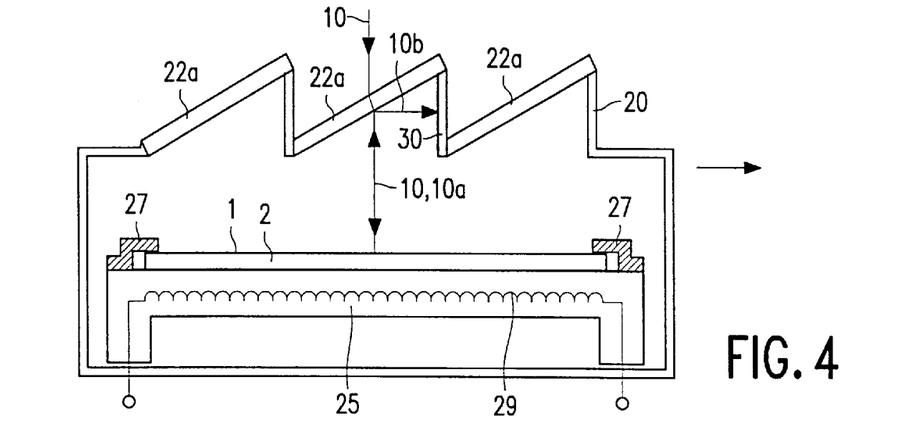

FIG. 4 illustrates a modified embodiment in which the cell 20 has a succession of side-by-side tilted windows 22*a* through which the whole length of the sample 1, 2 may be scanned with the laser beam 10. In this case, the sample 1,2 is clamped on the backing plate 25 by a peripheral clamping frame 27. By moving the cell 20 below the beam 10, the windows 22*a* are moved sequentially under the beam 10 as the cell 10 is moved (for example in X and Y directions) during the beam scanning. Each of these windows 22*a* is inclined to the beam 10 at an inclination angle θ of FIGS. 2*a* and 2*b*.

Figure 5:
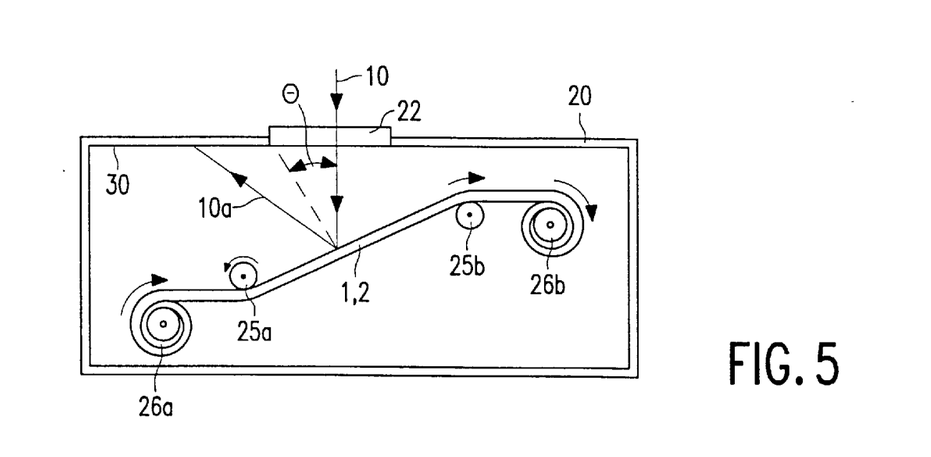

FIG. 5 illustrates a further embodiment in which the window 22 is not tilted, but the sample 1, 2 is tilted. The mounting means 25 for the film/substrate sample 1, 2 comprises a series of rollers including vertically staggered guide rollers 25*a* and 25*b*. The laser beam scanning is carried out by rotating the rollers on which the substrate 2 is mounted. In this way, the sample 1, 2 is fed over the rollers and moved continuously along within the cell 20. Because of the vertical staggering of the guide rollers 25*a* and 25*b*, the length of the sample 1, 2 which is exposed to the laser beam 10 through the window 22 is inclined between the rollers 25*a* and 25*b*. The angle θ of inclination between the beam 10 and the inclined perpendicular of the sample 1,2 may be in the range of 35° to 45°. In this situation the focused laser light 10a which is reflected from the film 1 is not reflected back to the window 22 but impinges on a side wall 30 of the cell 20 where it may be scattered and/or absorbed. Thus, the reflected light 10a from the tilted sample 1, 2 is not reflected back by the window 22 onto the laser-heated film 1.

In a specific example of the laser crystallisation treatment, a 248 nm wavelength from a pulsed KrF laser may be used, with an incident laser energy on the film 1 in the range of 100 to 300 mJ.cm$^{-1}$ per pulse. The pulse duration may be of the order of nanoseconds. A single pulse exposure could be used for crystallisation of the film 1, or exposure to multiple pulses (for example, five or ten such pulses) may be used. By this laser treatment the amorphous silicon material of the film 1 is converted to polycrystalline silicon material. The polycrystalline material may typically have a crystal grain size of 0.1 to 0.3 $\mu$m, and has good uniformity in accordance with the present invention. The ambient in the cell 20 may be a vacuum of, for example, about $2\times10^{-5}$ torr.

Having crystallised the semiconductor film 1 in the laser equipment of FIGS. 1, 3, 4 or 5, the semiconductor film 1 on the polymer substrate 2 may then be further processed in known manner to form thin-film circuit elements for the desired electronic device. Thus, for example, TFTs or thin-film diodes may be formed in circuit-element islands of the film 1 on the polymer substrate 2.

In combination with the present invention it can be advantageous to use also the process steps disclosed in pending UK patent application 9521855.8 (our reference PHB 34026) filed Oct. 25, 1995, together with one or more interface layers, so as to improve the adhesion of the crystallized film 1 and interface layer(s) on the polymer substrate 2. In this process:

(a) The polymer substrate 2 is pre-shrunk by a prolonged heating;
(b) A first insulating interface layer is deposited on the pre-shrunk polymer substrate 2 at a lower temperature than the prolonged heating temperature of step (a) to have reduced stress and good adhesion and a masking layer is deposited on the first insulating layer as a continuous layer over the substrate surface;
(c) The semiconductor film 1 is subjected to the laser beam treatment (as in the present FIGS. 1, 2, 3, 4 & 5) while the masking layer is present as a continuous layer over the substrate surface to mask the polymer substrate 2 against exposure to the laser beam 10;
(d) Thereafter the insulating and masking layer structure may be removed from most of the surface of the polymer substrate 2 except where separate semiconductor islands are formed from the film 1 for the thin-film circuit elements.

The semiconductor film 1 may form the masking layer. However, especially when the circuit-element islands are formed before the laser treatment, a separate masking layer may be provided sandwiched between first and second insulating interface layers. Although the first insulating layer deposited at a low temperature may have poor electrical insulation properties, the semiconductor film 1 may be deposited on the second insulating layer which may be deposited at a higher temperature on the masking layer so as to provide very good electrical insulation below the semiconductor islands.

It will be evident that many other modifications and variations are possible within the scope of the present invention. Thus, for example, although the invention is particularly advantageous for laser crystallisation systems, tilting of the sample 1, 2 and/or a window 22 may also be used to direct reflected laser light away from the film 1 in other laser apparatus, for example when a laser beam 10 is used to anneal a dopant implant in the film 1 and/or to thermally diffuse dopant in a film 1.

From reading the present disclosure, other modifications and variations will be apparent to persons skilled in the art. Such modifications and variations may involve other features which are already known in the art and which may be used instead of or in addition to features already disclosed herein. Although patent claims have been formulated in this application to particular combinations or features of a method and of an apparatus, and it should be understood that the scope of the disclosure of the present application includes any and every novel feature or combination of features disclosed herein either explicitly or implicitly and together with all such modifications and variations, whether or not relating to the main inventive concepts disclosed herein and whether or not it mitigates any or all of the same technical problems as these main inventive concepts. The applicants hereby give notice that new patent claims may be formulated to such features and/or combinations of such features during prosecution of the present application or of any further application derived or claiming priority therefrom.

I claim:

1. A method of manufacturing an electronic device wherein a semiconductor film on a polymer substrate is subjected to a laser treatment with a laser beam, the beam being transmitted through a window over the film, the beam being reflected by the film, and the window and the polymer substrate being inclined with respect to one another to prevent the reflected beam from impinging again on the film.

2. A method of manufacturing an electronic device wherein a semiconductor film on a substrate is subjected to a laser treatment with a laser beam, the beam having an incident beam being transmitted through a window over the film, characterised in that the substrate is of heat-distortable polymer material which forms at least temporarily a concave distortion area in the substrate at an area where the film is heated by the incident beam, the incident beam is reflected by the film at the concave distortion area, and the reflected beam is prevented from being reflected back again to the heated area of the film by the window and substrate being arranged in an inclined relationship to one another.

3. A method as claimed in claim 1, wherein the window is the window of a cell within which the polymer substrate is mounted for the laser treatment, and the laser beam is scanned along the film during the laser treatment by moving the cell under the laser beam.

4. A method as claimed in claim 3, wherein the window comprises a succession of side-by-side windows which are moved sequentially under the beam as the cell is moved during the beam scanning, each of which side-by-side windows is inclined to the beam.

5. A method as claimed in claim 1, wherein the window is the window of a cell within which the polymer substrate is mounted for the laser treatment, and the laser beam is scanned along the film during the laser treatment by moving the polymer substrate along within the cell.

6. A method as claimed in claim 5, wherein the window is inclined to the beam.

7. A method as claimed in claim 5, wherein the polymer substrate where mounted in the path of the beam is inclined to the beam.

8. A method as claimed in claim 5, wherein the polymer substrate is mounted on rollers within the cell and is moved along within the cell by rotation of the rollers.

9. A method as claimed in claim 1, wherein perpendicular to the window and/or the polymer substrate in an area of the beam path is inclined to the beam at an angle in a range of 20° to 60°.

10. Laser apparatus suitable for use in the method of claim 1 and comprising a cell for accommodating a polymer substrate with a semiconductor film for a laser treatment and mounting means in the cell for mounting the polymer substrate for exposing the film to a laser beam through a cell window over the polymer substrate, wherein the cell window and the mounting means for the polymer substrate are inclined with respect to one another to prevent the reflected beam from impinging again on the film.

* * * * *